(12) United States Patent
Soriano

(10) Patent No.: US 9,199,437 B2
(45) Date of Patent: Dec. 1, 2015

(54) PANEL ASSEMBLY RETAINER AND METHOD OF USE

(75) Inventor: Israel Solano Soriano, Puebla (MX)

(73) Assignee: GM Global Technology Operations LLC, Detroit, MI (US)

(*) Notice: Subject to any disclaimer, the term of this patent is extended or adjusted under 35 U.S.C. 154(b) by 410 days.

(21) Appl. No.: 13/449,849

(22) Filed: Apr. 18, 2012

(65) Prior Publication Data

US 2013/0276293 A1 Oct. 24, 2013

(51) Int. Cl.
| | |
|---|---|
| F16B 37/04 | (2006.01) |
| B32B 27/12 | (2006.01) |
| F16B 5/02 | (2006.01) |
| F16B 41/00 | (2006.01) |
| B32B 7/12 | (2006.01) |
| B32B 27/30 | (2006.01) |
| F16B 37/06 | (2006.01) |

(52) U.S. Cl.
CPC . *B32B 27/12* (2013.01); *B32B 7/12* (2013.01); *B32B 27/306* (2013.01); *F16B 5/02* (2013.01); *F16B 5/0225* (2013.01); *F16B 37/041* (2013.01); *F16B 41/002* (2013.01); *B32B 2262/0253* (2013.01); *B32B 2262/0276* (2013.01); *B32B 2262/101* (2013.01); *B32B 2262/14* (2013.01); *B32B 2605/00* (2013.01); *F16B 37/067* (2013.01); *Y10T 29/49963* (2015.01); *Y10T 403/46* (2015.01)

(58) Field of Classification Search
CPC .... F16B 37/061; F16B 37/041; F16B 37/043; F16B 41/002; F16B 5/0225
USPC ......... 411/512, 508–510, 182, 908, 432, 533, 411/111–113, 104, 171, 108, 999
See application file for complete search history.

(56) References Cited

U.S. PATENT DOCUMENTS

| | | | | |
|---|---|---|---|---|
| 2,669,153 | A * | 2/1954 | Launder | 411/512 |
| 4,890,966 | A * | 1/1990 | Umezawa | 411/340 |
| 5,380,136 | A * | 1/1995 | Copple et al. | 411/183 |
| 5,468,104 | A * | 11/1995 | Reid et al. | 411/113 |
| 6,594,870 | B1 * | 7/2003 | Lambrecht et al. | 24/297 |
| 7,516,534 | B2 * | 4/2009 | Easterbrook et al. | 29/509 |
| 2003/0230044 | A1 * | 12/2003 | Peterson | 52/716.5 |
| 2004/0083583 | A1 * | 5/2004 | Bradley et al. | 24/297 |
| 2005/0202740 | A1 * | 9/2005 | Tilton et al. | 442/181 |
| 2007/0160441 | A1 * | 7/2007 | Reindl | 411/433 |
| 2008/0044255 | A1 * | 2/2008 | Rosemann | 411/508 |
| 2009/0103997 | A1 * | 4/2009 | Csik et al. | 411/112 |
| 2011/0123294 | A1 * | 5/2011 | Kempf et al. | 411/508 |

FOREIGN PATENT DOCUMENTS

CN 1036621 A 10/1989

* cited by examiner

*Primary Examiner* — Flemming Saether
(74) *Attorney, Agent, or Firm* — Quinn Law Group, PLLC

(57) ABSTRACT

A panel assembly includes a retainer, a first panel, and a second panel. A weld stud extends from the first panel. The second panel is positioned adjacent to the first panel and defines a hole that circumscribes the weld stud. The retainer includes a base and a nut. The base includes an annular cap and a cylindrical guide feature. The nut has radial fins, one of which is beveled. The cylindrical guide feature is positioned within the hole and circumscribes the weld stud. One of the radial fins is positioned adjacent to an upper surface of the cap, while the radial fin having the beveled surface is received within a slot defined by the cap to secure the nut to the base and the stud. Tabs may be arranged on an inner bore of the nut. A method of using the retainer in a panel assembly is also disclosed.

10 Claims, 3 Drawing Sheets

PANEL ASSEMBLY RETAINER AND METHOD OF USE

TECHNICAL FIELD

The present disclosure relates to a panel assembly retainer and to a method of using the same.

BACKGROUND

Stud welding is a particular form of spot welding in which the head of a threaded fastener is end-welded to the surface of a component. Weld studs are commonly used in manufacturing processes to align and join adjacent pieces of sheet metal. However, weld studs can be difficult to weld to a component with precision. Additionally, many possible dimensional variations exist in material, packaging space, and process steps in a given manufacturing environment. Collectively, such variations can make installed weld studs relatively difficult to locate with a mating nut and another piece of sheet metal.

SUMMARY

A panel assembly is disclosed herein that includes adjacent first and second panels, a weld stud that is welded to and extends from the first panel, and a panel assembly retainer. The second panel defines a hole that circumscribes the weld stud. The retainer is glued or otherwise securely affixed to the second panel, and thus forms a part of assembly (POA) component of the second panel. The retainer facilitates installation of the second panel with respect to the first panel as set forth in detail herein.

The retainer includes a base and a nut. The base includes an annular cap and a cylindrical guide feature arranged orthogonally with respect to the cap. The cap has an outer wall that defines a slot. The nut has a pair of radially-extending (radial) fins. One radial fin is positioned adjacent to an upper surface of the cap. The other radial fin is received within the slot of the cap to thereby secure the nut to the base and stud.

A retainer is also disclosed herein that may be used with a panel assembly having a weld stud. The retainer includes a base and a nut. The base includes an annular cap with an outer wall that defines a slot. The base defines a cylindrical guide feature arranged orthogonally with respect to the cap. The cylindrical guide feature circumscribes the weld stud when the guide feature is installed in the panel assembly. The nut includes a pair of radial fins. One of the radial fins is positioned adjacent to an upper surface of the cap. The other radial fin is received within a slot defined by the cap to thereby secure the nut to the base.

A method of using the retainer in a panel assembly includes providing the retainer, which is configured as set forth above, and then positioning the cylindrical guide feature into a hole defined by one of the panels of the panel assembly. The method also includes positioning a radial fin of the nut adjacent to a surface of the cap and inserting another radial fin of the nut into a slot defined by an outer wall of the cap. The radial fin inserted into the slot has a beveled surface for guiding the weld stud into the nut.

The above features and advantages and other features and advantages of the present invention are readily apparent from the following detailed description of the best modes for carrying out the invention when taken in connection with the accompanying drawings.

DETAILED DESCRIPTION

Figure 1:
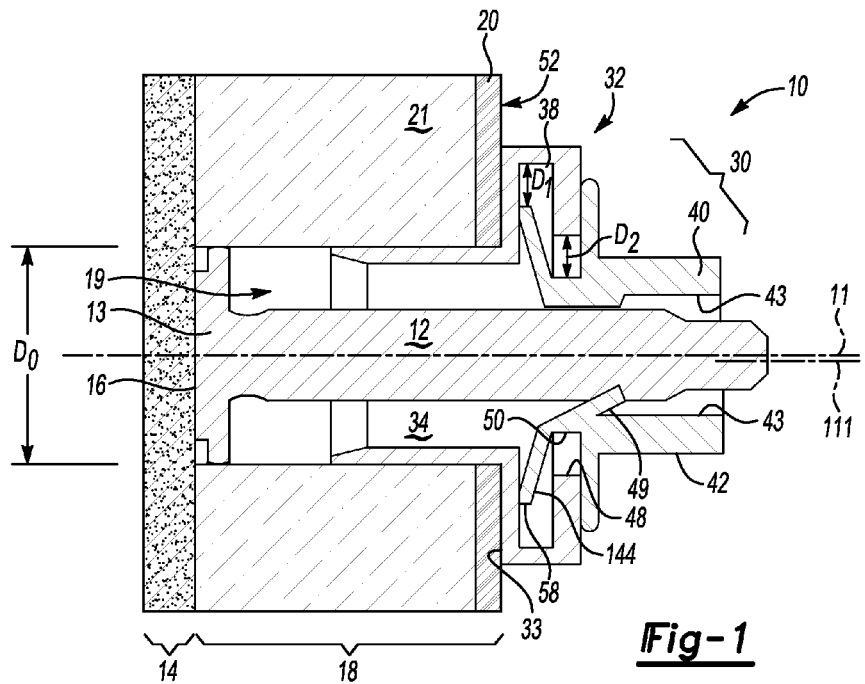
FIG. 1 is a schematic cutaway side view illustration of an example panel assembly using the presently disclosed retainer.

Referring to the drawings, wherein like reference numbers correspond to like or similar components throughout the several figures, an example panel assembly 10 is shown in a schematic cross-sectional view in FIG. 1. The panel assembly 10 includes respective first and second panels 14 and 18 that are joined using a retainer 30. The retainer 30 may be installed, either by hand or via an automated process, to the second panel 18 prior to assembly to the first panel 14. The various elements of the retainer 30 are described in further detail below with reference to FIGS. 2-4. Additionally, an example method 100 of using the retainer 30 in conjunction with the panel assembly 10 of FIG. 1 or any other suitable panel assembly is set forth below with reference to FIG. 5.

The second panel 18 of FIG. 1 may include an insulator 20, for instance a sheet or layer of ethylene vinyl acetate (EVA). The use of an EVA sheet may be particularly useful when the second panel 18 is configured as a vehicle back panel, i.e., a panel assembly separating a passenger cabin from a truck bed. In such an example embodiment, the insulator 20 may be adhesively bonded to a subpanel 21 of the second panel 18, for instance one or more sheets of textile fibers such as fiberglass, polypropylene fibers, polyester fibers, and/or a fiber blend.

The second panel 18 may be attached to the first panel 14 using a plurality of weld studs 12, only one of which is shown in FIG. 1 for illustrative simplicity. A head 13 of each weld stud 12 is welded to a surface 16 of the first panel 14 prior to installation of the second panel 18, as is well understood in the art. As noted above, it is difficult to perform such welding and maintain a precise axial alignment of the weld stud 12, potentially leading to some degree of dimensional variation. Other dimensional variation may be present due to packaging space, process requirements, and other factors.

Additionally, the second panel 18 shown in FIG. 1 defines a hole 19. The hole 19 has a diameter $D_0$ through which the weld stud 12 extends through the second panel 18, i.e., axially with respect to a center axis 11 of the weld stud 12. The retainer 30 has an axis 111 that may differ from the axis 11 of the weld stud 12 due to dimensional variances. The present retainer 30 is thus configured to help absorb some of this dimensional variation and thereby help an operator to locate the weld stud 12 when connecting the second panel 18 to the first panel 14.

In a particular embodiment, the retainer 30 shown in FIG. 1 may be constructed of polyolefin alloy, i.e., an alloy of polypropylene plastic and ethylene propylene (EP), or ethylene propylene diene monomer (EPDM) rubber. Such materials are known as being compatible with EVA, and thus may be used in the vehicle back panel/EVA insulator 20 embodiment noted above. Moreover, such materials enable the retainer 30 to be installed by hand over the weld stud 12. Hand installation may be required in certain applications due to materials of construction and/or space restrictions. Additionally, hand installation may help to speed the installation process and lower costs by avoiding the usage of tools.

The weld stud 12 of FIG. 1 may be an M6×1 weld stud of the type known in the art. In such a non-limiting example embodiment, the hole 19 that is defined by the second panel 18 may have a diameter of 12 mm to 14 mm. In another embodiment, the diameter may be about 13.8 mm±0.5 mm. In the same embodiment, a nut 40 of the retainer 30 may be sized to absorb about 2.6 mm±0.5 mm of dimensional variation during installation. However, changing the size and/or material characteristics of the retainer 30 in other applications will allow the retainer 30 to be used with any diameter hole 19 or weld studs 12 of any typical size, and/or to absorb greater levels of dimensional variation.

Figure 2:
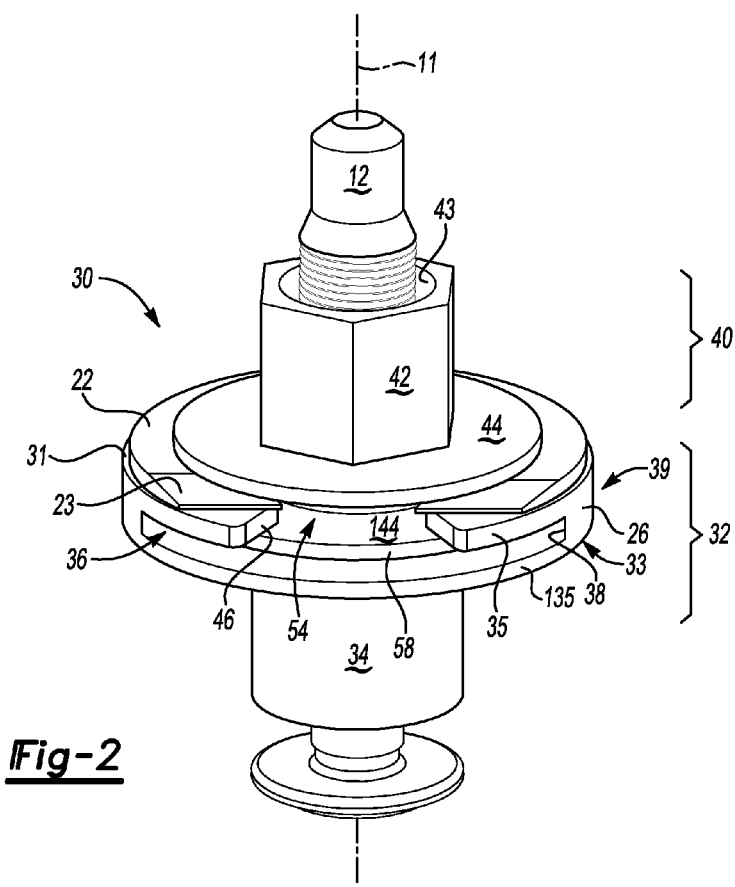
FIG. 2 is a schematic perspective view illustration of the retainer and weld stud usable with the panel assembly shown in FIG. 1.

In addition to the nut 40, the retainer 30 shown in FIG. 1 includes a base 32 having a cylindrical guide feature 34 and an annular cap 39 (see FIG. 2). The cap 39 has an underside 33 that may be adhered to an exposed surface 52 of the insulator 20 using glue or another suitable adhesive material. The cylindrical guide feature 34 is positioned within the hole 19 of the second panel 18. Other structural elements of the base 32, including the guide feature 34, are described in further detail with reference to FIGS. 2 and 3.

The nut 40 of FIG. 1 may include radial locator tabs 49 that extend from a center bore 43 of the nut 40 as explained below with reference to FIG. 4. At least some of the locator tabs 49 may contact the weld stud 12 to help prevent separation of the second panel 18 from the first panel 14. The nut 40 is designed to float with respect to the hole 19, or more precisely over the inner diameter of the cylindrical guide feature 34, as indicated by dimension $D_5$ in FIG. 3. In this manner, the nut 40 absorbs dimensional variations during its installation.

A dimension $D_1$ is defined between a wall 38 partially defining the boundary of a slot 36 (see FIG. 2) and an edge surface 58 of the lower fin 144. Another distance $D_2$ is defined between an inner circumferential wall 48 of an upper tier 35 (see FIGS. 2 and 3) of the cap 39 and a neck wall 50 of the nut 40. The neck wall 50, which is also shown in FIG. 4, defines a neck region separating the upper fin 44 and lower fin 144 from each other, with the neck wall 50 having the dimension $D_7$ as shown in FIG. 4. In one embodiment, the distances $D_1$ and $D_2$ of FIG. 1 are equal when the nut 40 is installed with respect to the base 32, or approximately equal, i.e., within±5 percent of the larger of the two diameters if there is any variance.

As noted above, weld studs such as the example weld stud 12 of FIG. 1 are difficult to weld with a precise axial alignment. Even if the weld studs 12 are properly aligned, the limited packaging space in a typical vehicle or other system may complicate the installation of relatively large panels such as the second panel 18. The construction of the nut 40 as set forth below with reference to FIG. 4 provides some flexibility to an operator in an otherwise challenging assembly environment.

Referring to FIG. 2, the retainer 30 is shown in more detail in an installed position with respect to the weld stud 12. The base 32 is generally T-shaped. That is, the base 32 includes the annular cap 39 which is orthogonally arranged with respect to the guide feature 34 and vice versa to form the general T-shape profile. The cap 39 and the guide feature 34 may be integrally formed, or they may be separately formed and welded or bonded together.

An outer wall 26 of the cap 39 defines the slot 36 noted above, which at least partially separates the cap 39 into an upper tier 35 and a lower tier 135. The upper tier 35 defines a wedge-shaped opening 54. As noted above with reference to FIG. 1, the underside 33 of the cap 39 may be glued/adhered to the insulator 20 at the exposed surface 52.

An upper surface 31 of the cap 39 may be affixed to an optional C-shaped damper 22, e.g., flock tape or other suitable material. Such a damper 22 may have a tapered face 23 that is oriented toward the slot 36 as shown to facilitate the entrance of the fin 44 into the cap 39 of base 32. The damper 22 may help absorb additional noise/vibration while providing improved sliding characteristics of the nut 40 against the base 32. Such characteristics may be desirable in applications that must meet strict noise, vibration, and harshness (NVH) standards.

The nut 40 shown in FIG. 2 includes a pair of radial fins 44, 144. The fin 44 forms an upper fin with respect to the relative position of the base 32, and therefore the fin 44 is referred to hereinafter as the upper fin 44. Likewise, fin 144 is referred to hereinafter as the lower fin 144. The upper fin 44 is positioned adjacent to the upper surface 31 of the cap 39, or adjacent to an upper surface of the optional damper 22, i.e., a surface adjacent to the head 42. The lower fin 144 is received within the slot 36. The size of the slot 36 helps the base 32 and any space surrounding the lower fin 144, e.g., dimension $D_1$ shown in FIG. 1, to absorb some of the movement of the nut 40 during installation. The respective upper and lower fins 44, 144 are formed integrally with or welded to the head 42, e.g., a hex head as shown.

Figure 3:
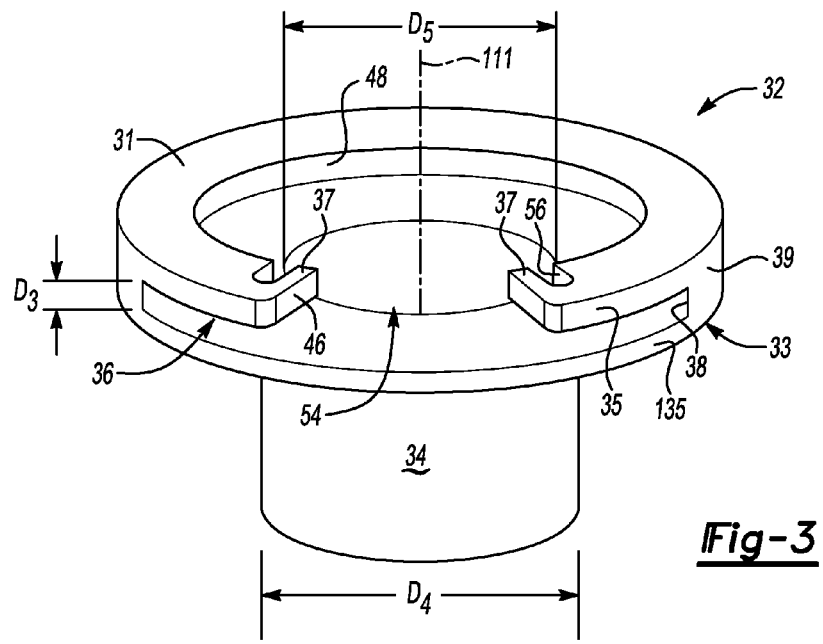
FIG. 3 is a schematic perspective view illustration of a base of the retainer shown in FIG. 2.

Referring to FIG. 3, the upper tier 35 of the base 32 is separated from the lower tier 135 by a calibrated distance $D_3$. The distance $D_3$ and slot 36 are large enough to admit the lower fin 144. The cylindrical guide feature 34 has an outer diameter $D_4$ and an inner diameter $D_5$. The outer diameter $D_4$ is slightly less, e.g., 1 mm less, than the diameter $D_0$ of the hole 19 shown in FIG. 1 to allow the guide feature 34 to be inserted into the hole 19 without interference. The inner diameter $D_5$ is substantially larger than the diameter of the weld stud 12, as best shown in FIG. 1.

The upper tier 35 defines a pair of radial retention tabs 37 adjacent to the opening 54. Each of the retention tabs 37 has a side wall 46. The tabs 37 may be constructed by forming a U-shaped recess 56 in an inner circumferential wall 48 of the upper tier 35. The neck wall 50 of FIG. 4 will touch the walls 46 while the nut 40 is being installed into the cap 39. The U-shaped recesses 56 help with the bending of the retention tabs 37 while the nut 40 is being inserted into the cap 39.

The retention tabs 37 are resilient to facilitate entrance of the nut 40 into the cap 39 of the base 32, and are oriented radially inward, i.e., toward the axis 111. The retention tabs 37 engage the nut 40 of FIG. 2, thereby preventing inadvertent separation of the nut 40 from the base 32 during transport, handling, or installation. The remaining elements of the base 32 shown in FIG. 3 are described above with reference to FIG. 2.

Figure 4:
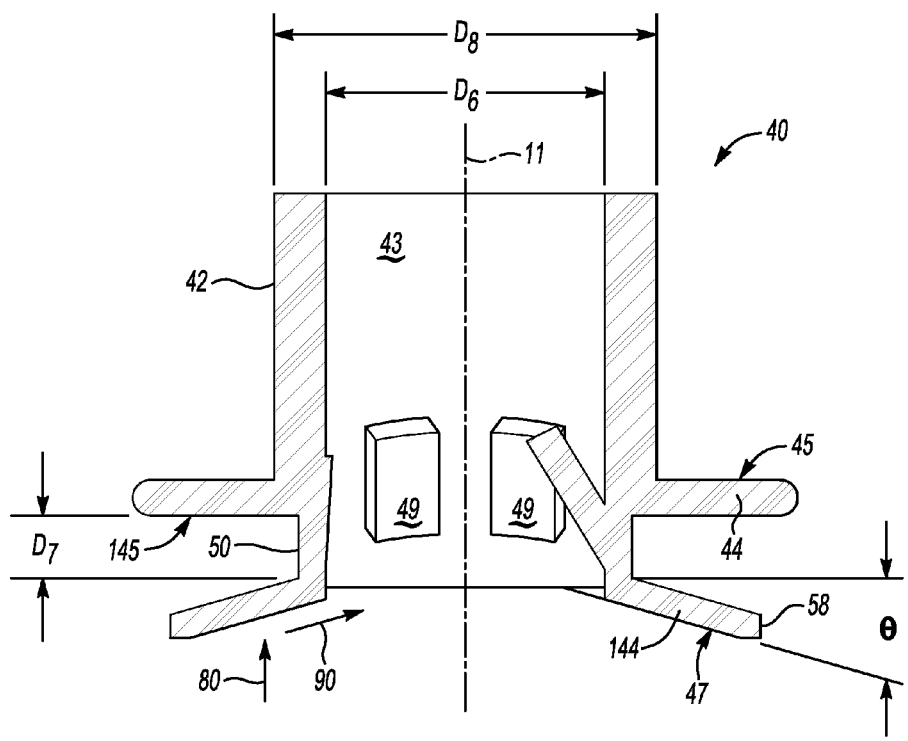
FIG. 4 is a schematic cutaway view of a nut of the retainer shown in FIG. 2.

Referring to FIG. 4, which is schematic and not to scale with respect to FIG. 3, the nut 40 includes the respective upper and lower fins 44 and 144 noted above with reference to FIG. 2, and has an inner diameter $D_6$ defined by the bore 43. The fins 44, 144 are arranged with respect to the nut 42, the latter having an outer dimension $D_8$. FIGS. 3 and 4 are schematic and thus not to scale. In any embodiment, however, diameter $D_6$ of FIG. 4 is less than diameter $D_5$ of FIG. 3, with both diameters $D_5$ and $D_6$ exceeding the outer diameter of the weld stud 12 as shown in FIG. 1.

In an example embodiment, the upper fin 44, which is separated from the lower fin 144 by a distance $D_7$, may be a solid circular disc having a top surface 45. Here, the dimension $D_7$ is slightly larger than the thickness of the upper tier 35 shown in FIG. 3. The top surface 45 is on a plane that is horizontal/flat. The underside 145 of the upper fin 44 helps to avoid noise intrusion by forming a seal against the upper surface 31 of the base 32 shown in FIG. 3, or against the upper surface of the optional C-shaped damper 22 shown in FIG. 2.

The lower fin 144 includes a beveled undersurface 47. The beveled undersurface 47 forms a calibrated angle θ with respect to the horizontal. In one embodiment, the angle θ is 10 to 20 degrees. In another embodiment the angle θ is about 15 degrees, i.e., 15 degrees±0.5 degrees. Use of such a beveled undersurface 47 may facilitate location of the weld stud 12 of FIGS. 1 and 2 during installation by guiding the weld stud 12 with respect to the nut 40. For example, a weld stud 12 installed in the direction of arrow 80, and with its center axis 11 in the same direction as arrow 80, will contact the beveled undersurface 47. Continued force on the retainer 30 will move the nut 40 along the beveled undersurface 47 in the direction of arrow 90, thus guiding the nut 40 into an installed position with respect to the weld stud 12. The beveled undersurface 47 also forms a barrier to noise intrusion from the direction of the first panel 14 of FIG. 1.

The nut 40 may also include a plurality of the locator tabs 49 noted above with reference to FIG. 1. Each locator tab 49 extends from the bore 43 of the nut 40. At least some of the tabs 49 angle upward at a calibrated angle, i.e., toward the head 42 shown in FIG. 2, and also radially inward, i.e., toward the axis 111 shown in FIG. 3. The calibrated angle in one embodiment may be about 60 to 65 degrees to help maintain the position of the nut 40 with respect to the weld stud 12 as explained below. Formation of the tabs 49 may be accomplished in various ways, including forming the bore 43 at one thickness, and then subsequently etching or removing material to form the tabs 49. The tabs 49 may also be formed separately and ultrasonically welded to the bore 43.

The locator tabs 49 that are angled are also resilient. Thus, with reference to FIG. 1, the weld stud 12 can push some of the tabs 49 against the center bore 43 when installed, and any tabs 49 located away from the weld stud 12 can guide the nut 40 toward the weld stud 12. Use of the tabs 49 may facilitate insertion and retention of the weld stud 12 of FIGS. 1 and 2, and may also help meet ergonomic force requirements, e.g., for installation efforts that are driven by hand.

Figure 5:
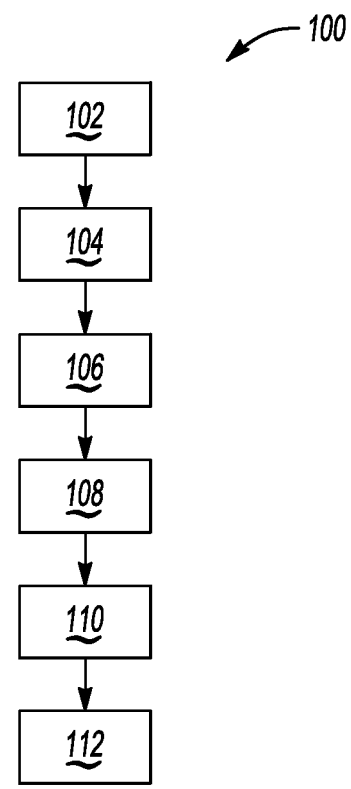
FIG. 5 is a flow chart describing an example method for forming the panel assembly shown in FIG. 1.

Referring to FIG. 5, an example method 100 is shown for a panel assembly such as the example panel assembly 10 of FIG. 1. The method 100 begins with step 102, wherein the retainer 30 described above is provided.

Step 104 may include applying glue or another suitable adhesive to the underside 33 of the base 32 shown in FIG. 2, and then inserting the cylindrical guide feature 34 of the base 32 shown in the same Figure into the hole 19 defined by the second panel 18 of FIG. 1. Insertion may occur immediately after pressing the base 32 to the second panel 18, or more precisely over the exposed surface 52 of the insulator 20, until the adhesive sets. The base 32 effectively becomes a part of the second panel 18. The method 100 then proceeds to step 106.

Alternatively, one could first apply glue around the hole 19, i.e., over the exposed surface 52, and then insert the guide feature 34 into the hole 19 and set the undersurface 33 over the exposed surface 52. However, such an approach may waste adhesive, e.g., by applying more adhesive than the circumferential undersurface 33 of the cap 39, and some adhesive may get into the hole 19 letting lumps at the base of the guide feature 34 which may limit the entrance of the weld stud 12 through the hole 19 while installing panel 10.

At step 106, the upper fin 44 of FIG. 4, i.e., the fin having the flat surface or profile as explained above, is positioned adjacent to the upper surface 31 of the cap 39 shown in FIG. 2, or alternatively to the C-shaped damper 22 shown in the same Figure. At the same time, the lower fin 144, i.e., the fin having the beveled undersurface 47 as shown in FIG. 4, is inserted into the slot 36 defined by the cap 39 to thereby secure the nut 40 to the base 32. The method 100 then proceeds to step 108.

At step 108, another panel, e.g., the first panel 14 of FIG. 1, is provided along with the accompanying weld stud 12.

At step 110, the weld stud 12 of FIGS. 1 and 2 is placed within the hole 19 shown in FIG. 1 such that the hole 19 circumscribes the weld stud 12. The dynamic element of step 110 may be the second panel 18 as opposed to the first panel 14, i.e., placement of the weld stud 12 in the hole 19 may be embodied as positioning of the hole 19 around the weld stud 12. The method 100 proceeds to step 112 when step 110 is complete.

At step 112, the nut 40 of FIG. 2 is pushed onto the weld stud 12 by an operator, i.e., by hand, to thereby connect the respective first and second panels 14 and 18. As the nut 40 is not internally threaded, the weld stud 12 of FIG. 1 may be externally threaded only to the extent necessary for engagement by the tabs 49 shown in FIG. 4. The retainer 30 of FIG. 1 thereby absorbs material, process, and installation variations while acting as a POA component of the second panel 18.

If the second panel 18 is later removed for service or reassembly, the nut 40 may be turned and thereby removed from the weld stud 12. In this instance, the base 32 and the nut 40 may remain attached to the second panel 18. At this point, the method 100 would resume at step 108, as indicated in phantom in FIG. 5.

Alternatively, the nut 40 may be installed into the cap 39 of the base 32. The nut 40 and base 32 may then be affixed to the surface 52 of the second panel 18. This alternative embodiment may make it easier for a supplier of the retainer 30 rather than providing the nut 40 and base 32 separately. For added simplicity, reduced complexity, and protection of the retainer 30, a supplier of the second panel 18 of FIG. 1 may prefer to install the retainer 30 as described above, i.e., by affixing the base 32 to the second panel 18 and thereafter pressing the nut 40 onto the base 32.

While the best modes for carrying out the invention have been described in detail, those familiar with the art to which this invention relates will recognize various alternative designs and embodiments for practicing the invention within the scope of the appended claims.

The invention claimed is:

1. A panel assembly comprising:
   a first panel;
   a weld stud that extends from the first panel;
   a second panel positioned adjacent to the first panel, wherein the second panel defines a hole that circumscribes the weld stud; and
   a retainer having:
      a base that includes an annular cap with an upper surface and a cylindrical guide feature, wherein the cylindrical guide feature is arranged orthogonally with respect to the annular cap, and wherein the annular cap defines a first tier and a second tier; and
      a nut having a pair of radial fins separated from each other by a distance along a longitudinal axis of the nut, wherein a first one of the radial fins is a flat circular disc and a second one of the radial fins has a beveled undersurface;

wherein:

the annular cap defines a slot between the first and second tiers;

the cylindrical guide feature is positioned within the hole of the second panel and circumscribes the weld stud;

the first radial fin is positioned adjacent to the upper surface of the annular cap outside of the slot; and the second radial fin is received within the slot of the annular cap to thereby secure the nut to the base and stud.

2. The panel assembly of claim 1, wherein the second panel includes a subpanel and an insulator positioned adjacent to the subpanel, and wherein an underside of the base is affixed to the insulator such that the insulator is positioned between the subpanel and the base.

3. The panel assembly of claim 2, wherein the insulator is constructed of ethylene vinyl acetate and the subpanel is constructed of textile fibers.

4. The panel assembly of claim 3, wherein the first panel and the second panel form a vehicle back panel assembly.

5. The panel assembly of claim 1, wherein the nut includes a plurality of radially-inwardly projecting locator tabs arranged on a center bore of the nut in contact with the weld stud.

6. The panel assembly of claim 1, further comprising a damper that is positioned adjacent to the base.

7. The panel assembly of claim 1, wherein the undersurface of the second radial fin forms a calibrated angle of 10 to 20 degrees with respect to the horizontal when the nut is connected to the base, and wherein the calibrated angle is sufficient to guide the nut toward the weld stud when the beveled radial fin contacts the weld stud.

8. The panel assembly of claim 7, wherein the calibrated angle is about 15 degrees.

9. The panel assembly of claim 1, wherein the slot at least partially separates the annular cap into the first and second tiers.

10. The panel assembly of claim 9, wherein the first tier has an inner circumferential wall that defines a pair of U-shaped recesses, and wherein a pair of inwardly-extending radial tabs are defined each adjacent to one of the U-shaped recesses, and each of which engages the nut.

* * * * *